(12) United States Patent
Bennett et al.

(10) Patent No.: US 8,972,399 B2
(45) Date of Patent: Mar. 3, 2015

(54) RANKING BASED ON SOCIAL ACTIVITY DATA

(75) Inventors: Paul Nathan Bennett, Kirkland, WA (US); Emre Mehmet Kiciman, Seattle, WA (US); Peter Richard Bailey, Kirkland, WA (US); Nikhil Dandekar, Kirkland, WA (US); Huizhong Duan, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 13/531,488

(22) Filed: Jun. 22, 2012

(65) Prior Publication Data
US 2013/0346404 A1 Dec. 26, 2013

(51) Int. Cl.
*G06F 17/30* (2006.01)
(52) U.S. Cl.
CPC .............................. *G06F 17/30867* (2013.01)
USPC ........................................................ 707/732
(58) Field of Classification Search
None
See application file for complete search history.

(56) References Cited

U.S. PATENT DOCUMENTS

| | | | |
|---|---|---|---|
| 7,124,353 B2 | 10/2006 | Goodwin et al. | |
| 7,152,061 B2 * | 12/2006 | Curtis et al. | 1/1 |
| 7,577,646 B2 * | 8/2009 | Chien et al. | 1/1 |
| 8,032,535 B2 | 10/2011 | Strehl et al. | |
| 8,180,804 B1 * | 5/2012 | Narayanan et al. | 707/798 |
| 2008/0215565 A1 | 9/2008 | Sun et al. | |
| 2009/0106235 A1 * | 4/2009 | Tankovich et al. | 707/5 |
| 2010/0070488 A1 | 3/2010 | Sylvain | |
| 2010/0082434 A1 | 4/2010 | Chen et al. | |
| 2010/0268710 A1 | 10/2010 | Strehl et al. | |
| 2011/0010366 A1 | 1/2011 | Varshavsky et al. | |
| 2011/0022621 A1 | 1/2011 | Luo et al. | |
| 2011/0219073 A1 * | 9/2011 | Lawler et al. | 709/204 |
| 2012/0011112 A1 | 1/2012 | Bian et al. | |
| 2012/0078884 A1 * | 3/2012 | Callari et al. | 707/722 |
| 2012/0078916 A1 | 3/2012 | Tseng | |
| 2012/0173320 A1 * | 7/2012 | Kail et al. | 705/14.4 |
| 2012/0229625 A1 * | 9/2012 | Calman et al. | 348/135 |

(Continued)

OTHER PUBLICATIONS

Ackerman, Mark S., and Brian Starr. "Social activity indicators: interface components for CSCW systems." Proceedings of the 8th annual ACM symposium on User interface and software technology, ACM, 1995.*

(Continued)

*Primary Examiner* — Jay Morrison
(74) *Attorney, Agent, or Firm* — Steve Wight; Judy Yee; Micky Minhas

(57) ABSTRACT

Various technologies described herein pertain to using social activity data to personalize ranking of results returned by a computing operation for a user. For each of the results returned by the computing operation, a respective first affinity of the user to a corresponding result and a respective second affinity of the user to the corresponding result can be calculated and used for ranking the results. The respective first affinity of the user to the corresponding result can be calculated based on correlations between social activity data of the user and social activity data of a first group of historical users that clicked the corresponding result. Moreover, the respective second affinity of the user to the corresponding result can be calculated based on correlations between the social activity data of the user and social activity data of a second group of historical users that skipped the corresponding results.

20 Claims, 9 Drawing Sheets

(56) References Cited

U.S. PATENT DOCUMENTS

2012/0295633 A1* 11/2012 Yom-Tov et al. .......... 455/456.1
2012/0310831 A1* 12/2012 Harris et al. .................... 705/44

OTHER PUBLICATIONS

Bigdeli, Elnaz, and Zeinab Bahmani, "Comparing accuracy of cosine-based similarity and correlation-based similarity algorithms in tourism recommender systems," 4th IEEE International Conference on Management of Innovation and Technology, IEEE, 2008, ICMIT 2008.*

Randfish, "Facebook=Twitter's Influence on Google's Search Rankings", Retrieved at <<http://www.seomoz.org/blog/facebook-twitters-influence-google-search-rankings>>, Apr. 19, 2011, pp. 1-42.

Sheng, et al., "A Personalized Search Results Ranking Method Based on WordNet", Retrieved at <<http://ieeexplore.ieee.org/stamp/stamp.jsp?tp=&arnumber=5360060>>, Sixth International Conference on Fuzzy Systems and Knowledge Discovery, (FSKD), Aug. 14, 2009, pp. 500-504.

Ghose, et al., "An Empirical Analysis of Search Engine Advertising: Sponsored Search in Electronic Markets", Retrieved at http://opimweb.wharton.upenn.edu/documents/seminars/paidsearch.pdf>>, Management Science, Jul. 27, 2009, pp. 1-40.

"International Search Report & Written Opinion for PCT Patent Application No. PCT/US2013/046449", Mailed Date:Jul. 17, 2014, Filed Date: Jun. 19, 2013, 11 Pages.

* cited by examiner

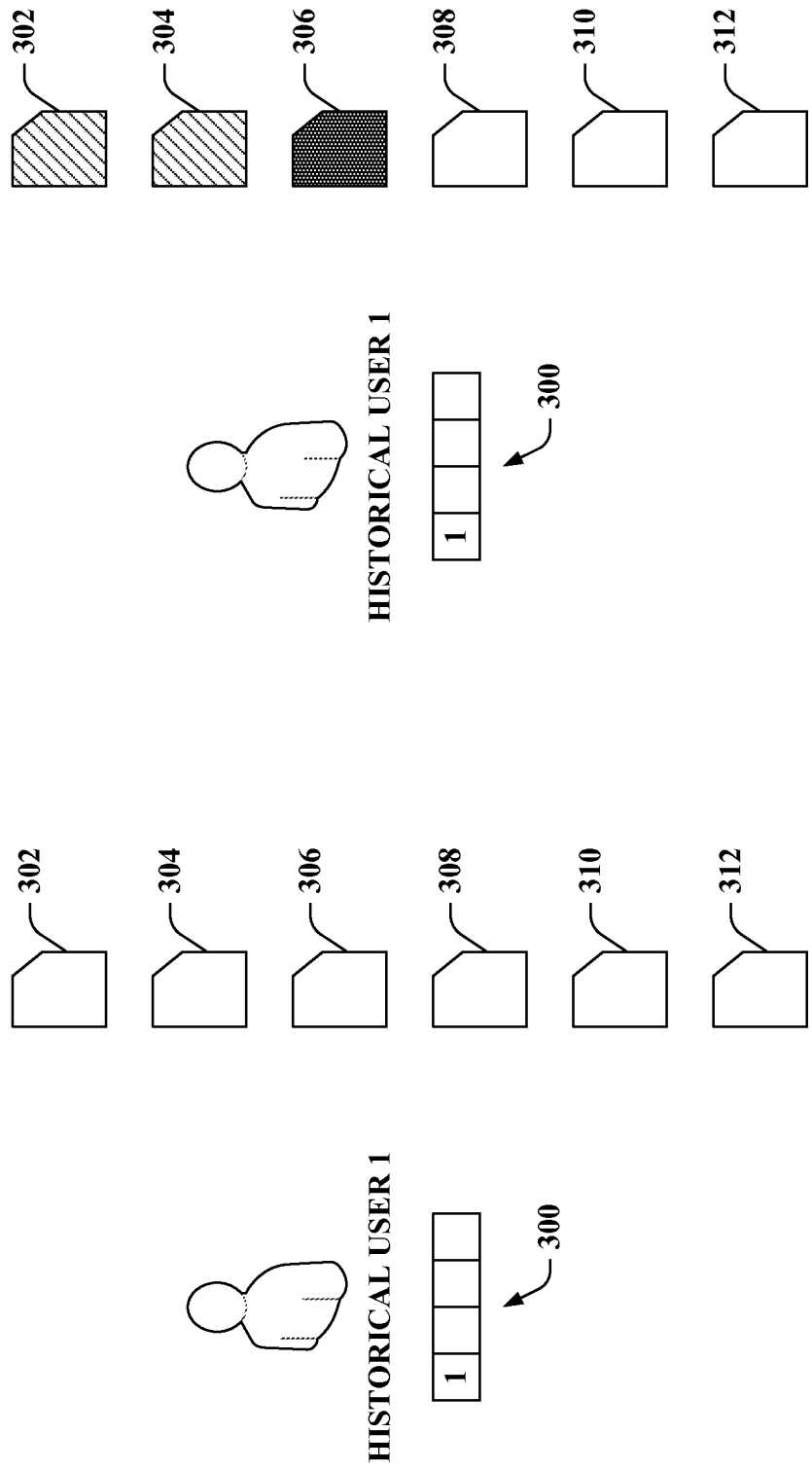

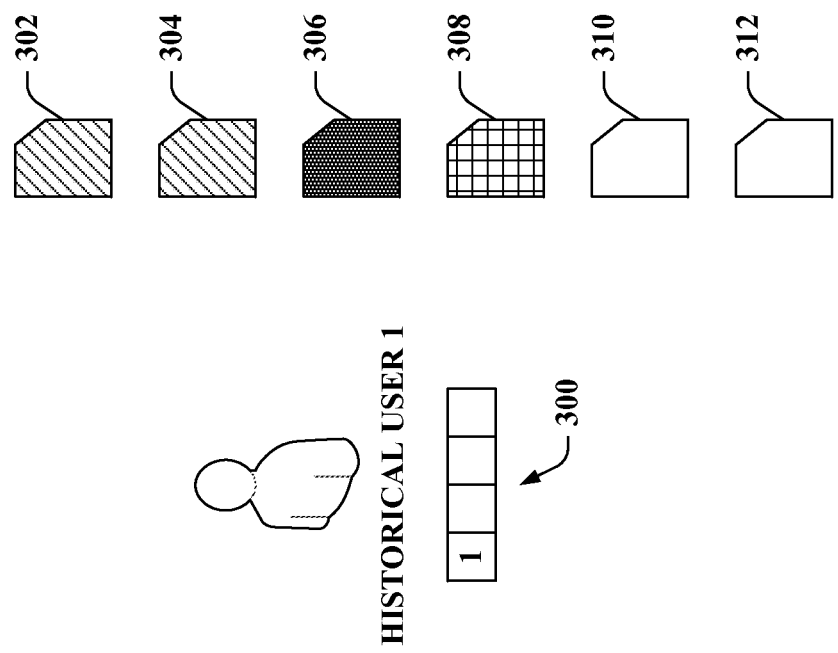

US 8,972,399 B2

RANKING BASED ON SOCIAL ACTIVITY DATA

BACKGROUND

A social network service is an online service, platform, or site that can facilitate building social networks among people (e.g., based on shared interests, activities, backgrounds, real-life connections, etc.). The social network service can include a representation of each user (e.g., user profile), and each user can have connections with other users. The social network service can further allow users to share ideas, activities, events, interests, etc. within their individual networks, to subsets of their individual networks, or publicly (e.g., with users outside their individual networks).

Some conventional techniques employ data associated with a social network of a user to personalize search results returned by a search engine for such user. Some traditional approaches, for instance, use data associated with social network activities of other users connected to a particular user (e.g., one or two hop connections of the particular user, etc.) to augment or personalize search results returned responsive to a search query for the particular user. Examples of conventional techniques include annotating search results for the particular user based upon feedback pertaining to social network content expressed by the other users connected to the particular user and highlighting search results for the particular user that have been recently read or recommended by the other users connected to the particular user. However, sparseness of the data associated with social network activities of the other users connected to the particular user may lead to few search queries of the particular user being affected by such conventional techniques.

Moreover, other conventional techniques for personalizing search results returned by a search engine for a given user commonly utilize search history data of the given user. Thus, data related to activities of the given user when employing the search engine can be used to personalize search results for that given user. However, if the given user has not previously visited and used the search engine (e.g., the given user is a new user of the search engine), then the search results typically are unable to be personalized if employing such a conventional technique. Additionally, if the given user performs a new type of search using the search engine that expresses a new kind of interest, then the search history of the given user may not be particularly relevant if used to personalize search results for the given user. By way of illustration, if the given user previously employed the search engine to perform a plurality of searches related to programming languages, then the search history for the given user may lack relevance to a subsequent search related to restaurants, and thus, may have limited affect if used to personalize search results returned responsive to a search query pertaining to restaurants.

SUMMARY

Described herein are various technologies that pertain to using social activity data to personalize ranking of results returned by a computing operation for a user. For each of the results returned by the computing operation, a respective first affinity of the user to a corresponding result and a respective second affinity of the user to the corresponding result can be calculated. The respective first affinity of the user to the corresponding result can be calculated based on correlations between social activity data of the user and social activity data of a first group of historical users that clicked the corresponding result. Moreover, the respective second affinity of the user to the corresponding result can be calculated based on correlations between the social activity data of the user and social activity data of a second group of historical users that skipped the corresponding results. Further, the results returned by the computing operation can be ranked based at least in part on the respective first affinity and the respective second affinity of the corresponding result for each of the results. Accordingly, the social activity data of the user can be used as a discriminating feature to calculate affinities of the user to each of the results based on empirical observation of behavior of the historical users and the social activity data of the historical users.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3-8 illustrates an example of generation of aggregated social activity data based on empirical observation of behavior of historical users and calculation of affinities for a current user based on the aggregated social activity data.

DETAILED DESCRIPTION

Figure 1:
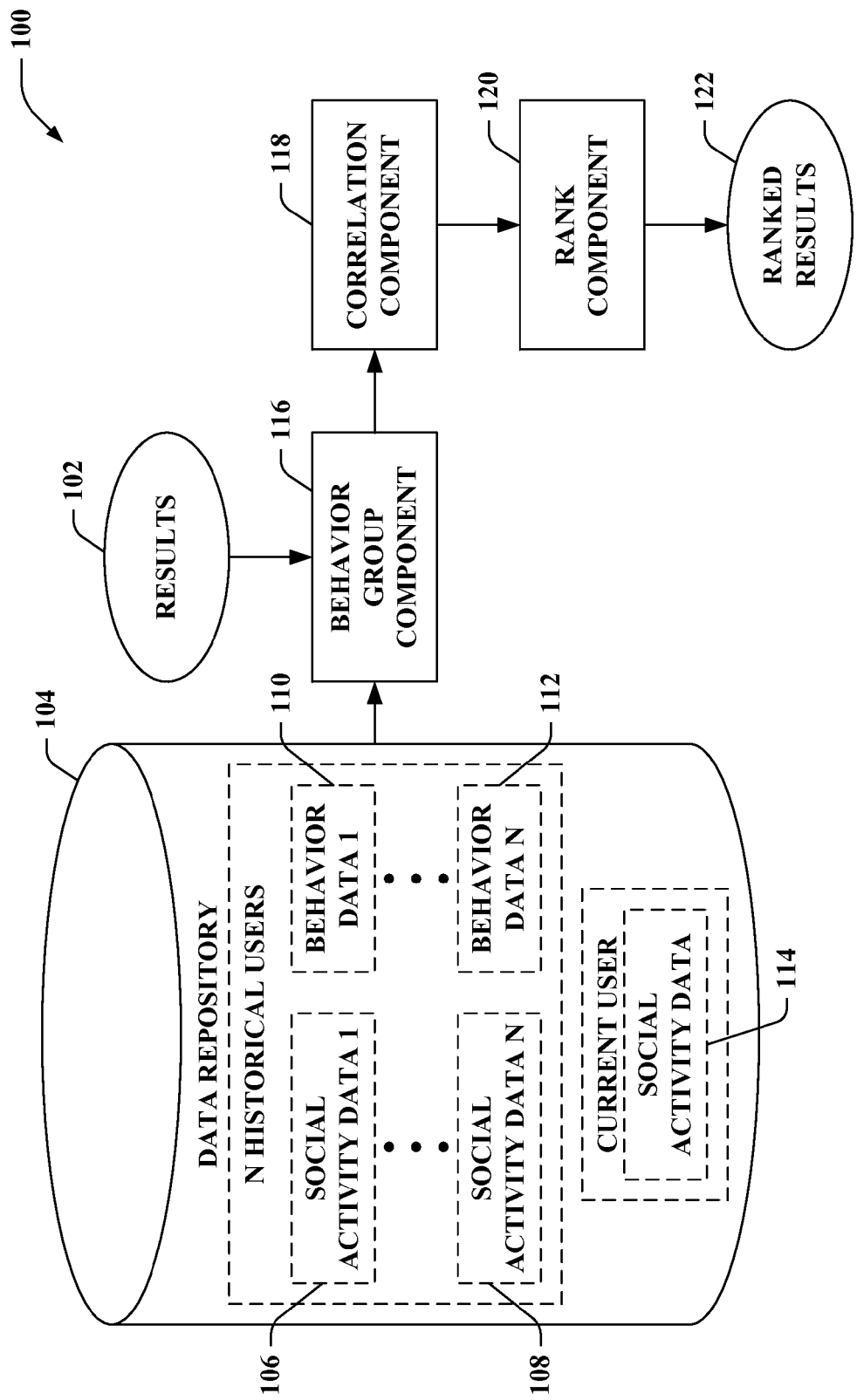
FIG. 1 illustrates a functional block diagram of an exemplary system that utilizes social activity data to personalize ranking of results returned by a computing operation.

Various technologies pertaining to interpreting social activity data based on observed behavior data of users are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, social activity data of a user can be used as a discriminating feature to calculate affinities of the user to results returned by a computing operation (e.g., search operation, autocomplete operation, advertisement selection operation, focused browsing operation, etc.). The social activity data of the user can be interpreted based on empirical observation of behavior data of historical users as well as social activity data of the historical users.

Referring now to the drawings, FIG. 1 illustrates a system 100 that utilizes social activity data to personalize ranking of results 102 returned by a computing operation. The system 100 includes a data repository 104. According to various embodiments, the data repository 104 includes social activity data of N historical users and behavior data of the N historical users, where N can be substantially any integer. More particularly, the data repository 104 can include social activity data 1 106 of a first historical user, . . . , and social activity data N 108 of an N-th historical user (collectively referred to as social activity data 106-108). Moreover, the data repository 104 can include behavior data 1 110 of the first historical user, . . . , and behavior data N 112 of the N-th historical user (collectively referred to as behavior data 110-112). Further, the data repository 104 includes social activity data 114 of a current user. As used herein, the term "current user" refers to a user for whom the results 102 returned by the computing operation can be personalized.

The system 100 can tailor an experience of the current user by personalizing the ranking of the results 102 to provide ranked results 122 for the current user. Such personalization is a function of past behaviors of the historical users (e.g., the behavior data 110-112) and common social activities (e.g., similarity between the social activity data 114 of the current user and social activity data 106-108 of the historical users).

The social activity data 106-108 and the social activity data 114 are records of activities of the respective users on a social network site (e.g., the social activity data 1 106 is a record of activities of the first historical user on the social network site, the social activity data 114 is a record of activities of the current user on the social network site, etc.). In accordance with various embodiments, the social activity data 106-108 and the social activity data 114 can include feedback pertaining to social network content expressed by the respective users (e.g., the social activity data 1 106 can include feedback pertaining to the social network content expressed by the first historical user, the social activity data 114 can include feedback pertaining to the social network content expressed by the current user, etc.). Expressed feedback pertaining to the social network content can be an explicit user-generated signal that may signify user preferences. By way of illustration, social network content can be a status update, comment, photo, link, advertisement, social network page, event, or the like. For example, a user (e.g., one of the historical users, the current user, etc.) can express the feedback pertaining to the social network content using a "like" feature, "follow" feature, "+1" feature, "recommend" feature, etc. of the social network service (e.g., the social network service can include a like button, follow button, +1 button, recommend button, etc. that can be employed by the user to express that he or she likes, enjoys, supports, etc. corresponding social network content). Expression of the feedback pertaining to the social network content can also be referred to as "liking," "following," "agreeing with," or "recommending" the social network content. According to another example, the user can express the feedback pertaining to the social network content using a "dislike" feature or substantially any other content voting system such as, for instance, a star rating system.

Additionally or alternatively, the social activity data 106-108 and the social activity data 114 can include profile data of the respective users, social network content shared by the respective users, lists of applications installed on devices of the respective users, lists of applications actively used by the respective users, a combination thereof, and so forth. Examples of the profile data of a user include the user's current city, hometown, gender, age, birthday, languages, education level, degrees, schools attended, employers, job titles, religion, political views, activities, interests, skills, expertise, awards, groups, and the like. Moreover, the content shared by a user can be a status update, comment, photo, link, advertisement, social network page, event, and so forth, for example.

In many of the examples set forth herein, the social activity data 106-108 and the social activity data 114 includes "likes" of social network content expressed by a user (e.g., the user has "liked" the social network content). It is to be appreciated, however, that these examples can be extended to substantially any other type of expressed feedback pertaining to the social network content or other types of social activity data (e.g., profile data, shared social network content, applications installed on devices, applications actively used, etc.).

Moreover, it is contemplated that the social activity data 106-108 and the social activity data 114 can be aggregated at various levels of granularity. For example, at their natural granularity, a like of Rock Band C may be treated differently than a like of Rock Band D. However, these likes can also be aggregated into a single group of related social activities, such as likes for things related to Rock Band C, or a coarser granularity group for all music related likes. Alternatively, finer granularity of likes can be used; for instance, a like of Rock Band C on a weekend can be a distinct signal from a like of Rock Band C on a weekday. According to an illustration, the groupings can be based on semantics, empirical similarities, and so forth.

Further, the social activity data 106-108 and the social activity data 114 can additionally or alternatively include inferred activity or profile data. For example, a person Z may not have expressed a like for Seattle, but if most people in the social network of person Z have liked Seattle, then it may be inferred that person Z also likes Seattle.

The behavior data 110-112 includes records of observed behaviors of the respective historical users. Such behaviors of the historical users can be observed in a context associated with the computing operation that returns the results 102. For example, in a context of search (e.g., when the computing operation is a search operation), the behavior data 110-112 can include records of interactions of the historical users with a search engine. Following this example, the behavior data 110-112 can include logs of search results that are clicked and search results that are skipped by the historical users for a set of search queries. By way of illustration, the behavior data 1 110 can include a log of search results that are clicked and search results that are skipped by the first historical user for a first search query, search results that are clicked and search results that are skipped by the first historical user for a second query, and so forth. According to another example, in an advertising context (e.g., when the computing operation is an advertisement selection operation), the behavior data 110-112 can include logs of advertisements that are clicked and advertisements that are skipped by the historical users. By way of a further example, in an autocomplete context (e.g., when the computing operation is an autocomplete operation), the behavior data 110-112 can include logs of suggested search queries (e.g., supplied by a search engine) that are clicked and suggested search queries that are skipped by the historical users for a set of user input (e.g., search queries or portions thereof, etc.).

As used herein, the term "click" is intended to encompass substantially any manner of user selection and is not limited to selection by rapidly depressing and releasing a button. The user selection may be made using substantially any type of user interface. Moreover, in some cases, there may be no explicit selection by the user. For example, it may be inferred that a user preferred a search result answer that did not require further selection (e.g., weather result, direct answer to a question, etc.).

It is contemplated that substantially any computing operation, executed by a processor, can be performed to return the results 102 for the user. According to an example, the computing operation that returns the results 102 for the user can be a search operation that returns search results responsive to a search query for the user.

By way of another example, the computing operation that returns the results 102 for the user can be an autocomplete operation that returns suggested search queries for the user. For instance, the suggested search queries can be returned to the user without the user inputting a complete search query (e.g., the suggested search queries can be predicted based on a partial search query).

Pursuant to yet another example, the computing operation that returns the results 102 for the user can be an advertisement selection operation that returns advertisements for the user. Accordingly, based on the ranking as described below, one or more advertisements can be selected for the user. Further, the selected one or more advertisements can be rendered on a display for the user. For instance, the advertisement selection operation can be utilized to select paid search advertisements; yet, the claimed subject matter is not so limited.

Moreover, it is also contemplated that the techniques described herein can be applied to other applications (e.g., other computing operations that can return the results 102). Examples of such other applications include focused browsing on a site, general internet browsing (e.g., generating recommendations, etc.), and so forth.

The system 100 can interpret the social activity data 114 of the current user based on empirical observation of the behavior data 110-112 of the historical users and similarity of the social activity data 114 of the current user to the social activity data 106-108 of the historical users. Thus, the system 100 interprets the social activity data 114 through empirical observation of the historical users rather than through inference based on a semantic understanding of a social activity. According to an illustration, if the current user has expressed feedback pertaining to a social network page of a popular singer who has a diverse, theatric and flamboyant style (e.g., the current user has liked the social network page of the popular signer), then a direct or semantic approach to using this information in the context of a search engine may be to boost a ranking of a homepage of that popular signer in search results returned for the current user. In contrast, the system 100 interprets the social activity data 114 of the current user, such as the current user expressing feedback pertaining to the social network page of the popular singer according to the foregoing illustration, to empirically learn information by observing that historical users that similarly expressed feedback pertaining to the social network page of the popular singer are more likely than an average user to be searching for animation, humor, and science-related sites, and less likely than the average user to be searching for sports, gardening, or investing related sites. Moreover, the system 100 can further determine that users expressing feedback pertaining to the social network page of the popular singer are more or less likely to click or skip certain search results after issuing specific queries, for example.

It is to be appreciated that the empirical observations may stem from a semantic, demographic, or provenance relationship with a social activity. Yet, regardless of the nature of the relationship, the empirical information can be utilized by the system 100 to personalize ranking of the results 102 for the current user.

The system 100 further includes a behavior group component 116 that groups the N historical users according to the behavior data 110-112 for each of the results 102. For example, the behavior group component 116 can form a first group of the historical users observed to have a first behavior with respect to a first result and a second group of the historical users observed to have a second behavior with respect to the first result. Moreover, the behavior group component 116 can form a third group of the historical users observed to have the first behavior with respect to a second result and a fourth group of the historical users observed to have the second behavior with respect to the second result. The behavior group component 116 can similarly form groups for the remaining results 102 other than the first and second results. By way of illustration, the first behavior can be clicking a result and the second behavior can be skipping the result, or vice versa. Thus, the behavior group component 116 can create a group of the historical users that are more likely to click on a particular result and a disparate group of the historical users that are more likely to skip the particular result. It is also contemplated that more than two groups can be formed by the behavior group component 116 for each of the results 102 (e.g., if more than two possible behaviors with respect to a given result are possible).

According to an example in the context of search, the behavior group component 116 can form the groups from the N historical users based on the behavior data 110-112 for query-result pairs. Following this example, for search results (e.g., the results 102) returned responsive to a particular search query, the behavior group component 116 can form a first group of the historical users observed to click a first search result returned responsive to the particular search query and a second group of the historical users observed to skip the first search result returned responsive to the particular search query, a third group of the historical users observed to click a second search result returned responsive to the particular search query and a fourth group of the historical users observed to skip the second result returned responsive to the particular search query, etc. However, in accordance with another example, it is contemplated that the behavior group component 116 can form the groups from the N historical users based on the behavior data 110-112 for the each of the results 102 across queries. Pursuant to this example, regardless of the search query that returns the search results (e.g., the results 102), the behavior group component 116 can form a first group of the historical users observed to click a first search result across search queries and a second group of the historical users observed to skip the first search result across search queries, and so forth.

Moreover, the system 100 includes a correlation component 118 that determines correlations between the social activity data 114 of the current user and the social activity data 106-108 of the historical users in each of the groups formed by the behavior group component 116 for each of the results 102. For each of the results 102, the correlation component 118 can use the social activity data 114 of the current user to identify affinities to the result based on strengths of affiliations to each of the groups of the historical users corresponding to the aforementioned correlations.

More particularly, for each of the results 102 returned by the computing operation, the correlation component 118 can calculate a respective positive affinity of the current user to a corresponding result based on correlations between the social activity data 114 of the current user and the social activity data 106-108 of the historical users that clicked the corresponding result (e.g., a first group of historical users formed by the behavior group component 116). Moreover, for each of the results 102 returned by the computing operation, the correlation component 118 can calculate a respective negative affinity of the current user to the corresponding result based on correlations between the social activity data 114 of the current user and the social activity data 106-108 of the historical users that skipped the corresponding result (e.g., a second group of historical users formed by the behavior group component 116). According to an example, for each group of historical users and for each of the results 102, the correlation component 118 can sum the correlations between the social activity data 114 of the current user and the social activity data 106-108 of the historical users in the group for the result to determine the affinities to the results 102. By way of illustration in the context of search, for a given search result (e.g., from the results 102), the correlation component 118 can use the social activity data 114 of the current user to determine a positive affinity to the search result based on a strength of an affiliation to the group of users who have clicked the search result and a negative affinity to the search result based on a strength of an affiliation to the group of users who have skipped the search result.

The system 100 further includes a rank component 120 that ranks the results 102 returned by the computing operation based at least in part upon the affinities to the results 102 to output the ranked results 122. The affinities to the results 102 can be indicators used by the rank component 120 that influence the ranking of the results 102. However, it is to be appreciated that indicators other than the affinities to the results 102 may be provided to the rank component 120 and used for ranking the results 102. For example, the affinities to the results 102 can be a feature inputted to a standard ranking algorithm of a search engine. Following this example, a stronger affinity to click a result can cause that result to be ranked higher in a ranking over results on which the user is unlikely to click (e.g., evinced by a stronger affinity to skip a result).

According to an example, the behavior group component 116 and the correlation component 118 can calculate the positive affinity and negative affinity of a current user u to a result d returned responsive to a query q as follows:

$$\text{PosAffinity}(u,d,q) = \Sigma_{I=Imp(q,h_u) \in h} \langle h_u, u \rangle II(\text{clicked}(I, h_u, d)) \quad (1)$$

$$\text{NegAffinity}(u,d,q) = \Sigma_{I=Imp(q,h_u) \in h} \langle h_u, u \rangle II(\text{skipped}(I, h_u, d)) \quad (2)$$

In the foregoing, Imp (q, $h_u$) is a set of searches (e.g., set of past impressions) for which a historical user $h_u$ has been observed as having made the query q, $\langle h_u, u \rangle$ is a similarity function (e.g., dot product) between a historical user $h_u$ and the current user u, calculated as a function of shared likes of social network content, and clicked(I, $h_u$, d) and skipped(I, $h_u$, d) are indicator functions that return 1 if a user clicked a result or skipped a result, respectively, in the context of a search I, and returns 0 otherwise. Accordingly, the positive affinity (PosAffinity) can be calculated as a sum over past impressions of a dot product between the social activity data 114 of the current user u and the social activity data 106-108 of the historical users $h_u$ who made the query q and clicked the result d (e.g., omitting the historical users $h_u$ who made the query q and skipped the result d). Similarly, the negative affinity (NegAffinity) can be calculated as a sum over past impressions of a dot product between the social activity data 114 of the current user u and the social activity data 106-108 of the historical users $h_u$ who made the query q and skipped the result d (e.g., omitting the historical users $h_u$ who made the query q and clicked the result d).

According to an example, it is contemplated that the correlation component 118 can combine affinities for a particular result (e.g., a combined affinity score can be provided to the rank component 120 and used as a feature to rank the results 102). For instance, the correlation component 118 can combine a positive affinity and a negative affinity for a particular result (e.g., generate a combined affinity score by subtracting the negative affinity from the positive affinity). By way of another example, a combined affinity score can be directly computed by the correlation component 118 as a difference between a positive affinity and a negative affinity. Pursuant to yet another example, a weighted combination of a positive affinity and a negative affinity can be computed by the correlation component 118 (e.g., directly or indirectly computed). Following this example, substantially any weights can be applied to the affinities (e.g., equal weights, different weights). However, it is also contemplated that the separate affinities for a particular result can be provided to the rank component 120 (e.g., positive affinity and negative affinity can be separate features used to rank the results 102).

In accordance with another example, the correlation component 118 can select a subset of attributes of the social activity data 106-108 of the historical users and the social activity data 114 of the current user. An example of an attribute can be whether the current user or the historical users have expressed a like for Baseball Team V; hence, the social activity data 106-108 and the social activity data 114 can each include an array of attributes (e.g., elements) that can be selected. The subset of the attributes as selected can be used to calculate the affinities. The subset of the attributes can be selected overall or as a function of a query (e.g., a like of a rock band may be informative for music queries but not for cooking queries, etc.). Moreover, since different attributes of the social activity data 106-108 and the social activity data 114 can be unequally informative, weights for the attributes can be derived and used to effectuate the selection. Following this example, some attributes of the social activity data 106-108 and the social activity data 114 can be used to perform a dot product, while other attributes can be ignored (e.g., the other attributes may be uninformative, introduce noise, etc.).

Figure 2:
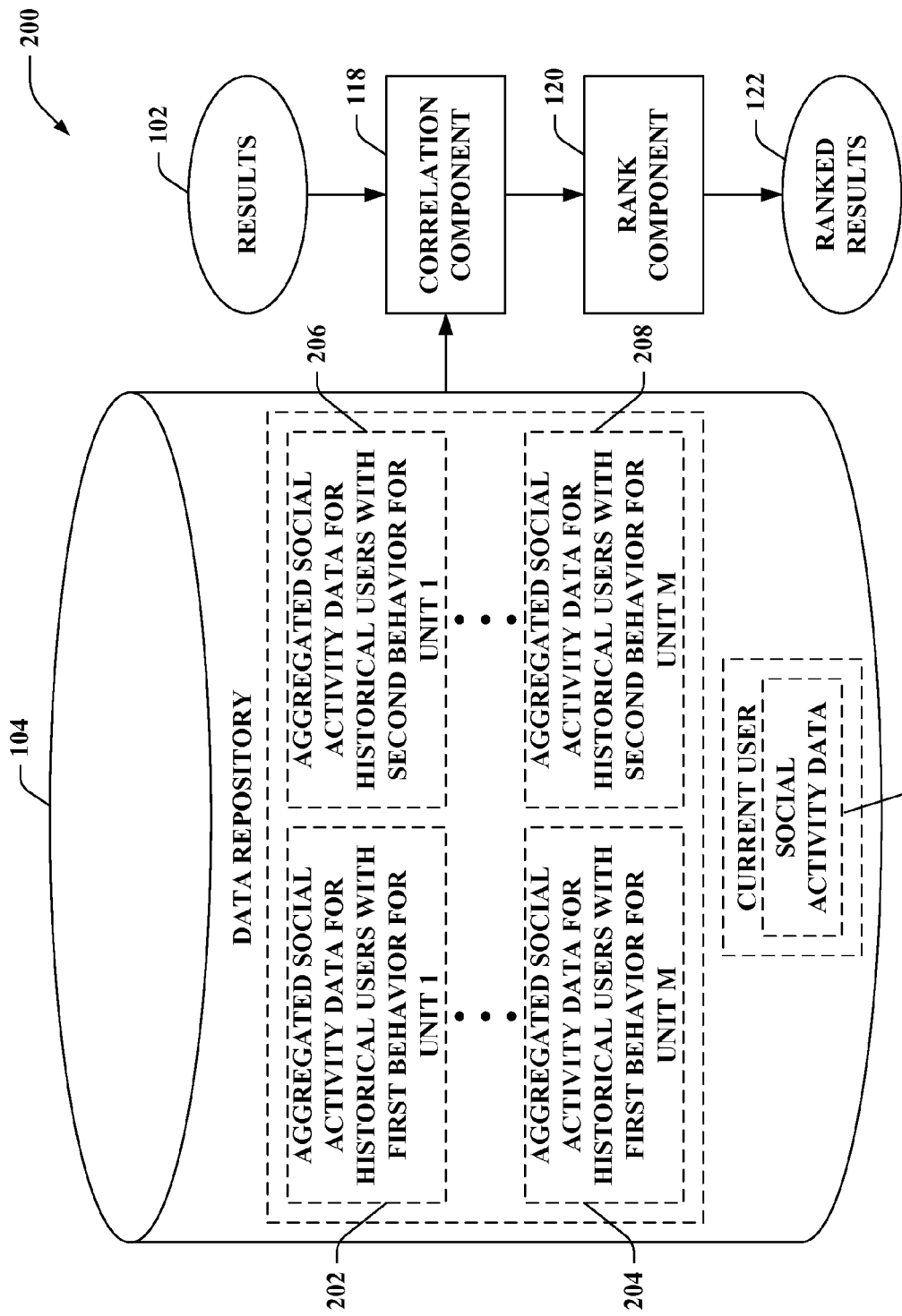
FIG. 2 illustrates a functional block diagram of an exemplary system that utilizes aggregated social activity data to personalize ranking of the results returned by the computing operation to provide the ranked results.

Now referring to FIG. 2, illustrated is a system 200 that utilizes aggregated social activity data to personalize ranking of the results 102 returned by the computing operation to provide the ranked results 122. The system 200 includes the data repository 104, the correlation component 118, and the rank component 120. Moreover, the data repository 104 includes the social activity data 114 of the current user.

The data repository 104 further includes aggregated social activity data of the historical users (e.g., the social activity data 106-108 of the historical users can be combined to form the aggregated social activity data retained in the data repository 104). The aggregated social activity data of the historical users can be built (e.g., aggregated) at various levels of granularity. Examples of the levels of granularity include a result level, a query-result level, a domain level, or a query-domain level. Accordingly, the social activity data 106-108 of the historical users can be aggregated based on behavior of the historical users for units that are dependent upon the level of granularity (e.g., a unit can be a result, a query-result pair, a domain, or a domain-result pair). For example, in the context of search, the aggregated social activity data can be built at a search result level (e.g., URL level), a query-search result level (e.g., query-URL level), a domain level (e.g., the domain can be a top-level domain or a second-level domain of a URL), or a query-domain level.

Accordingly, the data repository 104 can include aggregated social activity data for historical users with a first behavior for unit 1 202, . . . , and aggregated social activity data for historical users with the first behavior for unit M 204 (collectively referred to as aggregated social activity data for historical users with the first behavior 202-204), where M can be substantially any integer. Moreover, the data repository 104 can include aggregated social activity data for historical users with a second behavior for unit 1 206, . . . , and aggregated social activity data for historical users with the second behavior for unit M 208 (collectively referred to as aggregated social activity data for historical users with the second behavior 206-208). The aggregated social activity data for historical users with the first behavior 202-204 and the aggregated social activity data for historical users with the second behavior 206-208 are collectively referred to as aggregated social activity data 202-208. In the following examples, the first behavior is clicking a result and the second behavior is skipping the result; however, it is contemplated that the first behavior can be skipping the result and the second behavior can be clicking the result, at least one of the first behavior or the second behavior can be a behavior other than clicking or skipping a result, and so forth. Further, it is contemplated that the data repository 104 can also include aggregated social activity data for historical users with behavior(s) other than the first and second behaviors for the M units.

The correlation component 118 can determine correlations between the social activity data 114 of the current user and a subset of the aggregated social activity data 202-208 corresponding to the results 102. In particular, for the results 102 returned by the computing operation, the correlation component 118 can calculate respective positive affinities of the current user to the results 102 based on correlations between the social activity data 114 of the current user and the aggregated social activity data for historical users with the first behavior 202-204 (e.g., click) corresponding to the results 102. Moreover, for the results 102 returned by the computing operation, the correlation component 118 can calculate respective negative affinities of the current user to the results 102 based on correlations between the social activity data 114 of the current user and the aggregated social activity data for historical users with the second behavior 206-208 (e.g., skip) corresponding to the results 102. Thus, rather than summing over past impressions at a time of calculating affinities as described above with respect to equations (1) and (2), the correlation component 118 can employ the aggregated social activity data 202-208.

In accordance with an example, if the aggregated social activity data 202-208 is built at a query-result level (e.g., each of the M units is a query-result pair), then the correlation component 118 can calculate the positive affinity and negative affinity of the current user u to the result d returned responsive to the query q as follows:

$$\text{PosAffinity}(u,d,q) = \langle u, \Sigma_{I=Imp(q,h_u) \in H} h_u II(\text{clicked}(I, h_u, d)) \rangle = \langle u, \text{AggregatedSocialActivityDataForHistoricalUsersClickingResultforQuery} \rangle \quad (3)$$

$$\text{NegAffinity}(u,d,q) = \langle u, \Sigma_{I=Imp(q,h_u) \in H} h_u II(\text{skipped}(I, h_u, d)) \rangle = \langle u, \text{AggregatedSocialActivityDataForHistoricalUsersSkippingResultforQuery} \rangle \quad (4)$$

Accordingly, the positive affinity (PosAffinity) can be calculated as a dot product between the social activity data 114 of the current user u and the aggregated social activity data of the historical users $h_u$ who made the query q and clicked the result d (e.g., a subset of the aggregated social activity data for historical users with the first behavior 202-204). Similarly, the negative affinity (NegAffinity) can be calculated as a dot product between the social activity data 114 of the current user u and the aggregated social activity data of the historical users $h_u$ who made the query q and skipped the result d (e.g., a subset of the aggregated social activity data for historical users with the second behavior 206-208).

By way of another example, storage costs can be reduced by aggregating the social activity data 106-108 of the historical users at a result level (e.g., by summing over queries) as compared to the query-result level. Following this example, the correlation component 118 can calculate the positive affinity and negative affinity of the current user u to the result d returned responsive to the query q as follows:

$$\text{PosAffinity}(u,d) = \langle u, \Sigma_q \Sigma_{I=Imp(q,h_u) \in H} h_u II(\text{clicked}(I, h_u, d)) \rangle \quad (5)$$

$$\text{NegAffinity}(u,d) = \langle u, \Sigma_q \Sigma_{I=Imp(q,h_u) \in H} h_u II(\text{skipped}(I, h_u, d)) \rangle \quad (6)$$

The positive affinity (PosAffinity) can be calculated as a dot product between the social activity data 114 of the current user u and the aggregated social activity data of the historical users $h_u$ who clicked the result d across different queries (e.g., a subset of the aggregated social activity data for historical users with the first behavior 202-204). Similarly, the negative affinity (NegAffinity) can be calculated as a dot product between the social activity data 114 of the current user u and the aggregated social activity data of the historical users $h_u$ who skipped the result d across different queries (e.g., a subset of the aggregated social activity data for historical users with the second behavior 206-208).

In accordance with yet another example, storage costs can be further reduced by aggregating the social activity data 106-108 of the historical users at a domain level (e.g., one distribution for results in a domain summed over queries). Thus, the correlation component 118 can calculate the positive affinity and negative affinity of the current user u to the result d returned responsive to the query q as follows:

$$\text{PosAffinity}(u,\text{Site}(d)) = \langle u, \Sigma_q \Sigma_{I=Imap(q,h_u) \in H} h_u II(\text{clicked}(I, h_u, \text{Site}(d))) \rangle \quad (7)$$

$$\text{NegAffinity}(u,\text{Site}(d)) = \langle u, \Sigma_q \Sigma_{I=Imap(q,h_u) \in H} h_u II(\text{skipped}(I, h_u, \text{Site}(d))) \rangle \quad (8)$$

In the foregoing, Site(d) is a domain of the result d. Thus, the positive affinity (PosAffinity) can be calculated as a dot product between the social activity data 114 of the current user u and the aggregated social activity data of the historical users $h_u$ who clicked a result in the domain Site(d) across queries (e.g., a subset of the aggregated social activity data for historical users with the first behavior 202-204). Similarly, the negative affinity (NegAffinity) can be calculated as a dot product between the social activity data 114 of the current user u and the aggregated social activity data of the historical users $h_u$ who skipped a result in the domain Site(d) across queries (e.g., a subset of the aggregated social activity data for historical users with the second behavior 206-208).

FIGS. 3-8 illustrate an example of generation of aggregated social activity data based on empirical observation of behavior of historical users. Moreover, social activity data of a current user is utilized as a discriminating feature to calculate affinities of the current user to results returned responsive to a computing operation based on the aggregated social activity data. In the depicted example, a user can possibly express feedback pertaining to four items of social network content (e.g., four items for which a user can possibly express a like); thus, social activity data of a user is represented as an array that includes four elements. Moreover, in the illustrated example, two historical users (historical user 1 and historical user 2) and a current user provide a common search query that returns six search results. It is to be appreciated, however, that such example is provided for illustration purposes, and the claimed subject matter is not so limited.

As shown in FIG. 3, a first historical user (historical user 1) is associated with social activity data 300. According to the depicted example, the first historical user has expressed a like for a first item of social network content (e.g., a first element in the array for the social activity data 300 of the first historical user is set to a value of 1). Further, the first historical user has not expressed a like for the remaining three items of social network content (e.g., the second, third, and fourth elements in the array for the social activity data 300 of the first historical user are each set to value of 0).

As noted above, six search results are returned by a search engine responsive to the search query, namely, a first search result 302, a second search result 304, a third search result 306, a fourth search result 308, a fifth search result 310, and a sixth search result 312 (collectively referred to as search results 302-312). For example, the search results 302-312 can be displayed with the first search result 302 being positioned above the second search result 304, the second search result 304 being positioned above the third search result 306, and so forth. However, it is contemplated that the claimed subject matter is not so limited.

FIG. 4 illustrates behavior data of the first historical user. More particularly, the first historical user is shown to have skipped the first search result 302 and the second search result 304. Further, the first historical user is shown to have clicked the third search result 306 (e.g., indicated in a query-click log of the first historical user). For instance, search result(s) with a display position above a clicked search result can be considered to be skipped. Search result(s) with a display position below the clicked search result may or may not be considered to be skipped (e.g., a user is considered to have no interaction with search results that are neither skipped nor clicked).

According to an example, a search result displayed one position below the clicked search result can be considered to be skipped. Thus, as depicted in FIG. 5, the fourth search result 308 can be considered to have been skipped by the first historical user. Yet, pursuant to other examples, it is contemplated that search results displayed more than one position below the clicked search result can be considered to be skipped (e.g., X positions below the clicked search result where X is an integer, displayed on a same page as the clicked search result, etc.).

Figure 6:
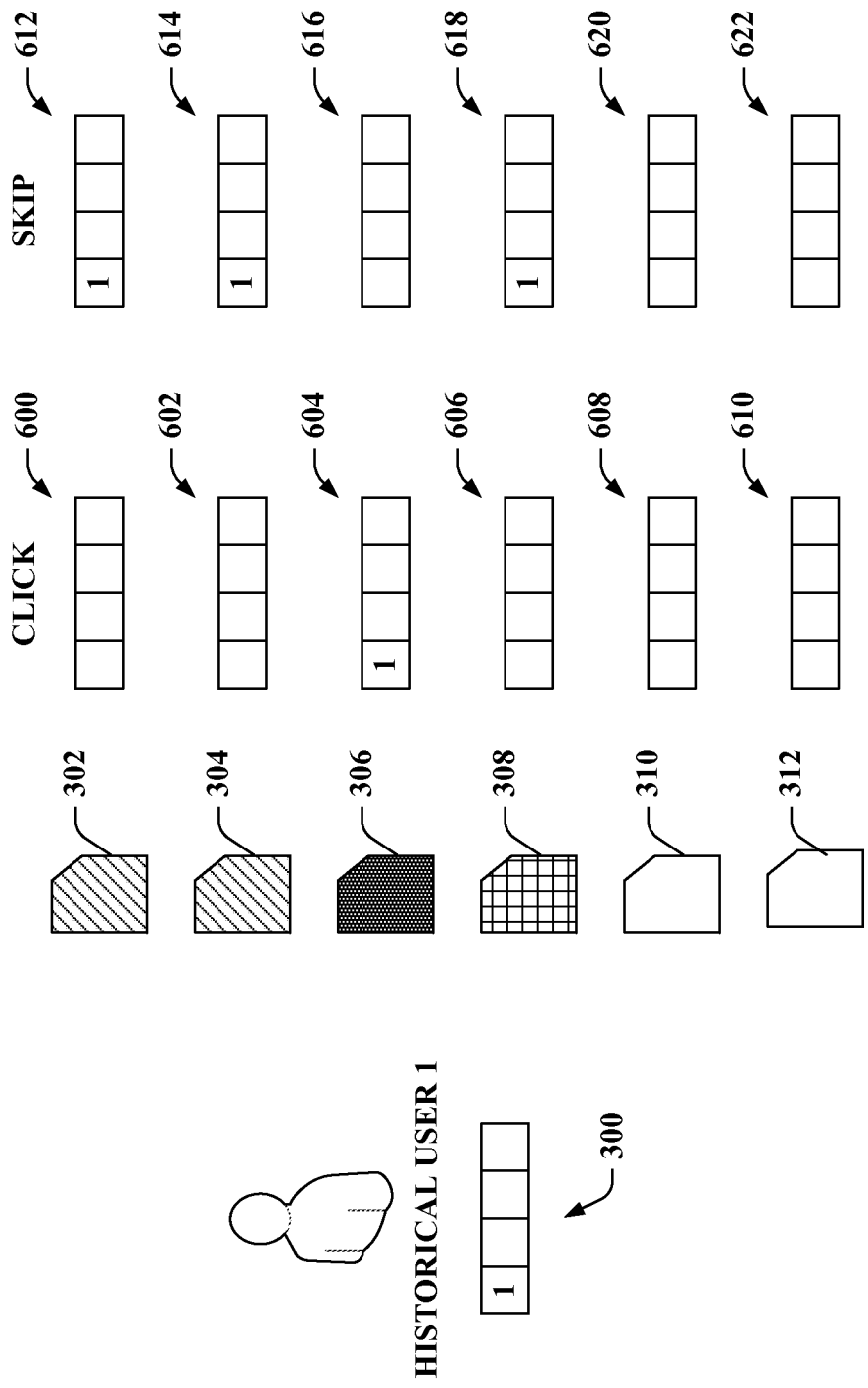

Turning to FIG. 6, illustrated are social activity data aggregation models (e.g., aggregated social activity data 202-208) to which the social activity data 300 of the first historical user can be added as a function of the behavior data of the first historical user. The example illustrated in FIG. 6 shows a social activity data aggregation model being built for each user behavior with query-search result level granularity. Thus, the following social activity data aggregation models can be built for historical users clicking search results returned responsive to the search query: a model 600 for historical users clicking the first search result 302, a model 602 for historical users clicking the second search result 304, a model 604 for historical users clicking the third search result 306, a model 606 for historical users clicking the fourth search result 308, a model 608 for historical users clicking the fifth search result 310, and a model 610 for historical users clicking the sixth search result 312. Moreover, the following social activity data aggregation models can be built for historical users skipping search results returned responsive to the search query: a model 612 for historical users skipping the first search result 302, a model 614 for historical users skipping the second search result 304, a model 616 for historical users skipping the third search result 306, a model 618 for historical users skipping the fourth search result 308, a model 620 for historical users skipping the fifth search result 310, and a model 622 for historical users skipping the sixth search result 312 (collectively referred to as models 600-622).

As noted above, the first historical user clicked the third search result 306 and skipped the search result 302, 304, and 308. Accordingly, when building the models 600-622, the social activity data 300 of the first historical user is added to the model 604 for historical users clicking the third search result 306, the model 612 for historical users skipping the first search result 302, the model 614 for historical users skipping the second search result 304, and the model 618 for historical users skipping the fourth search result 308. Moreover, the social activity data 300 of the first historical user is not added to the remaining models.

Figure 7:
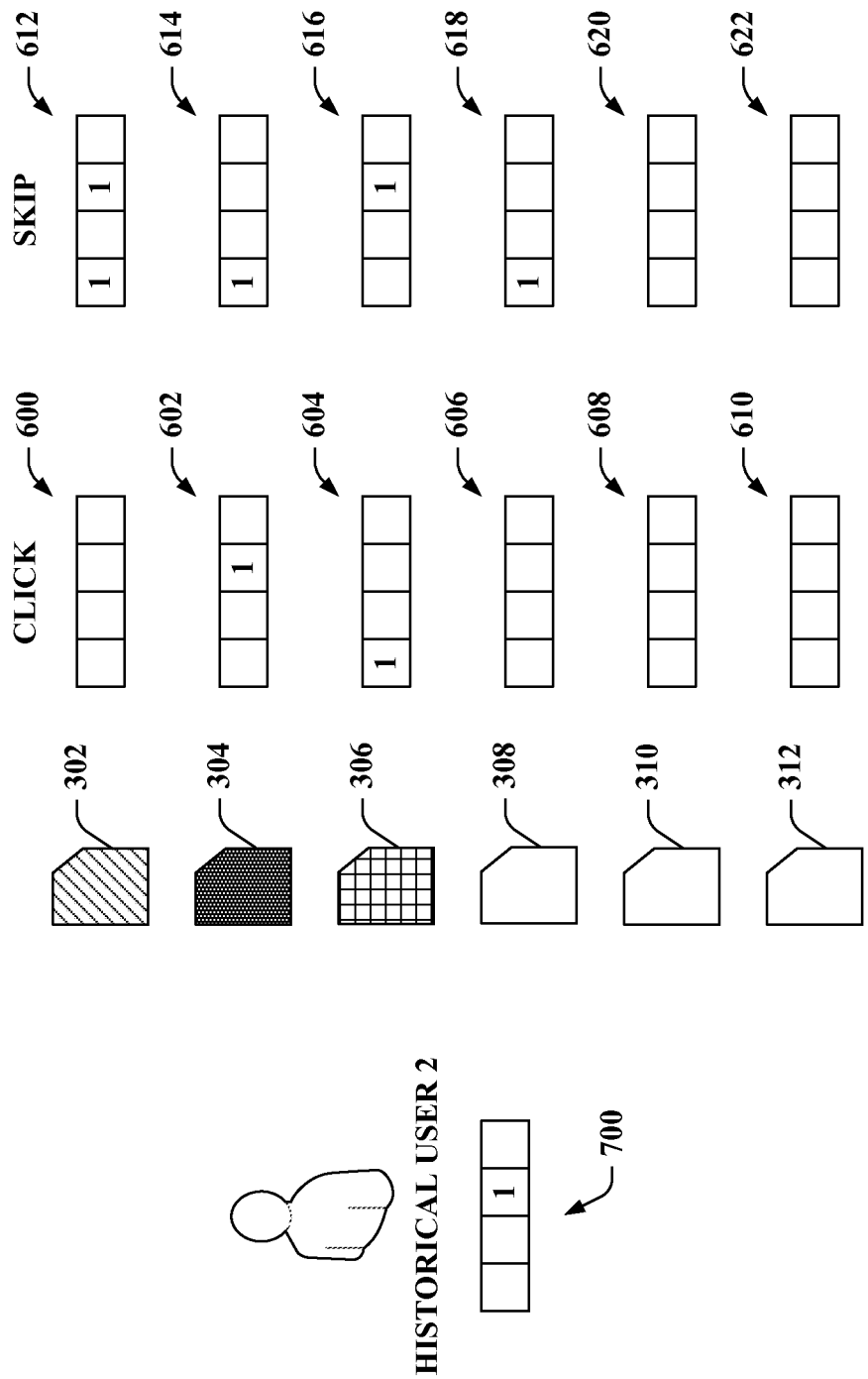

Now referring to FIG. 7, a second historical user (historical user 2) is shown to be associated with social activity data 700. According to the depicted example, the second historical user has expressed a like for the third item of social network content (e.g., the third element in the array for the social activity data 700 of the second historical user is set to a value of 1). Moreover, the second historical user has not expressed a like for the remaining three items of social network content (e.g., the first, second, and fourth elements in the array for the social activity data 700 of the first historical user are each set to value of 0).

Further, the second historical user is shown to have skipped the first search result 302 and clicked the second search result 304. Moreover, the third search result 306 (e.g., the search result immediately following the clicked search result) is considered to have been skipped by the second historical user. The second historical user is considered to lack interaction with the fourth search result 308, the fifth search result 310, and the sixth search result 312. When building the models 600-622, the social activity data 700 of the second historical user is added to the model 602 for historical users clicking the second search result 304, the model 612 for historical users skipping the first search result 302, and the model 616 for historical users skipping the third search result 306; the social activity data 700 is not added to the remaining models.

Figure 8:
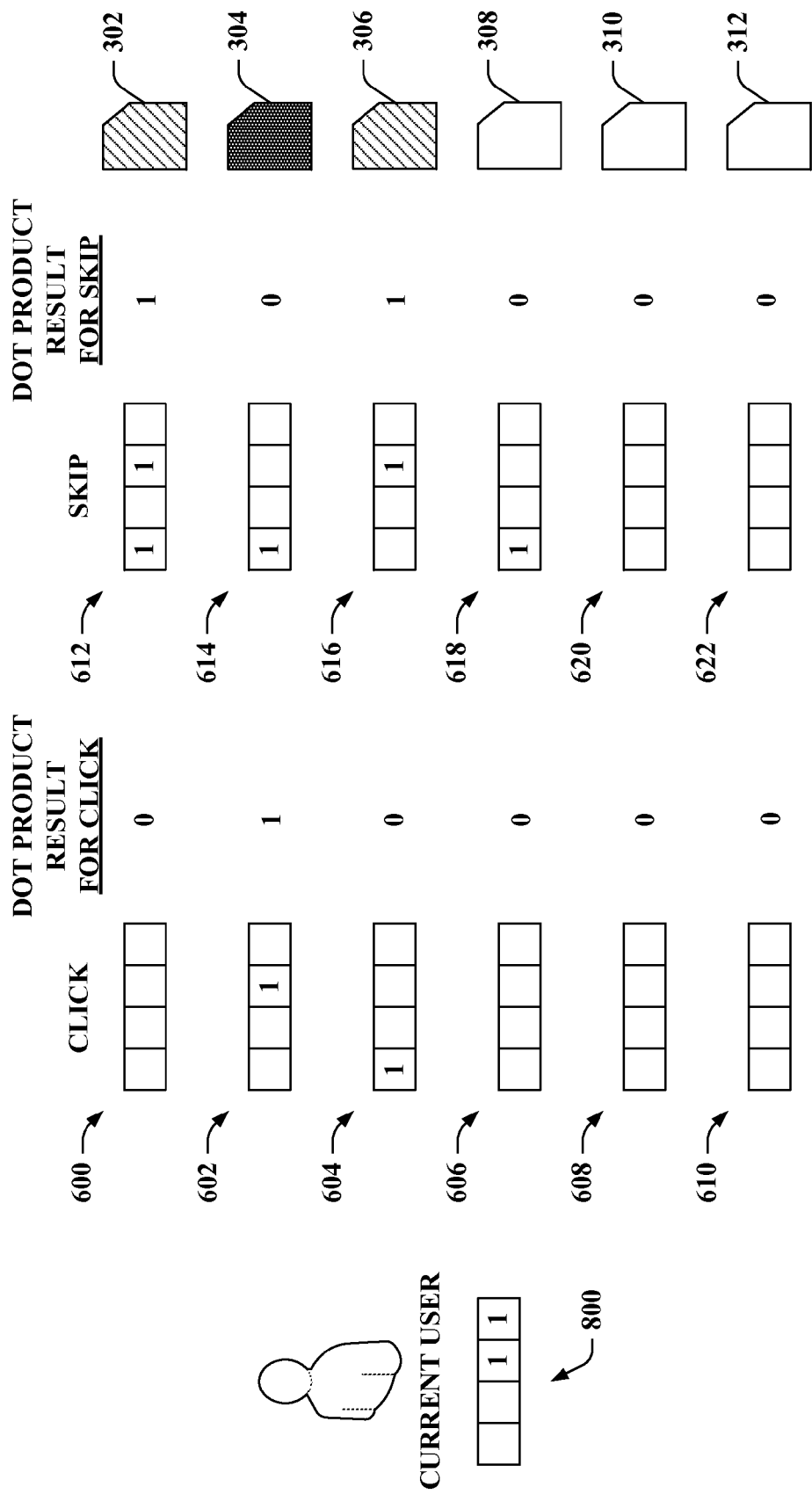

FIG. 8 illustrates utilization of the aggregated social activity data (e.g., the models 600-622) to calculate affinities for a current user. The current user is associated with social activity data 800. As depicted, the current user has expressed likes for the third item and the fourth item of social network content, while not expressing a like for the first item or the second item of social network content.

Affinities for the search results 302-312 can be calculated by computing respective dot products of the social activity data 800 of the current user with each of the models 600-622. For instance, a positive affinity of the current user to the first search result 302 can be computed as a dot product of the social activity data 800 of the current user with the model 600 for historical users clicking the first search result 302, and a negative affinity of the current user to the first search result 302 can be computed as a dot product of the social activity data 800 of the current user with the model 612 for historical users skipping the first search result 302. Positive affinities and negative affinities for the remaining results can be similarly computed. According to the depicted example, it can be determined that, for the current user, the affinities can influence ranking the second search result 304 higher and ranking the first search result 302 and the third search result 306 lower (e.g., if a negative affinity is subtracted from a corresponding positive affinity per search result to generate combined affinity scores then the first search result 302 and the third search result 306 can each have a combined affinity score of −1, the second search result 304 can have a combined affinity score of 1, and the remaining search results can each have a combined affinity score of 0).

In general, rather than semantically or directly interpreting social activity data of a user (e.g., based on primary signals associated with social activities), the techniques set forth herein relate to determining secondary signals associated with these social activities. Thus, correlations among behaviors and preferences of users and the social activity data of the users, which are not captured by the primary signal, can be identified using the techniques set forth herein.

Figure 9:
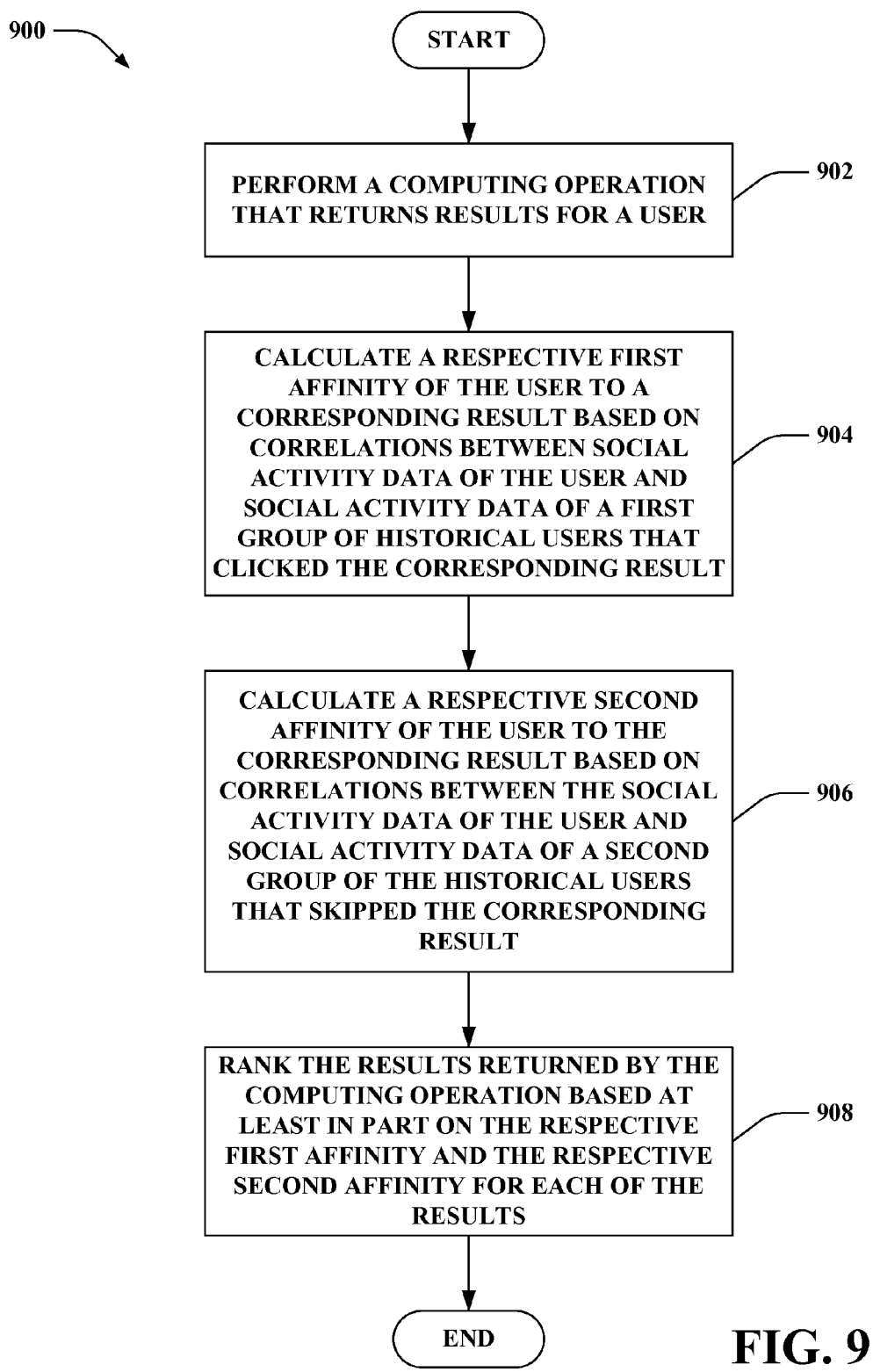
FIG. 9 is a flow diagram that illustrates an exemplary methodology of utilizing social activity data to personalize ranking of results returned by a computing operation.

FIG. 9 illustrates an exemplary methodology relating to using social activity data of a current user as a discriminating feature to calculate affinities of the current user to search results based upon empirical observation of behaviors of historical users and social activity data of the historical users. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of utilizing social activity data to personalize ranking of results returned by a computing operation. At 902, the computing operation that returns results for a user (e.g., current user) can be performed. For instance, the computing operation can be executed by a processor. At 904, a respective first affinity of the user to a corresponding result can be calculated for each of the results returned by the computing operation. The respective first affinity of the user to the corresponding result can be calculated based on correlations between social activity data of the user and social activity data of a first group of historical users that clicked the corresponding result. At 906, a respective second affinity of the user to the corresponding results can be calculated for each of the results returned by the computing operation. The respective second affinity of the user to the corresponding result can be calculated based on correlations between the social activity data of the user and the social activity data of a second group of the historical users that skipped the corresponding result. At 908, the results returned by the computing operation can be ranked based at least in part on the respective first affinity and the respective second affinity of the corresponding result for each of the results.

Figure 10:
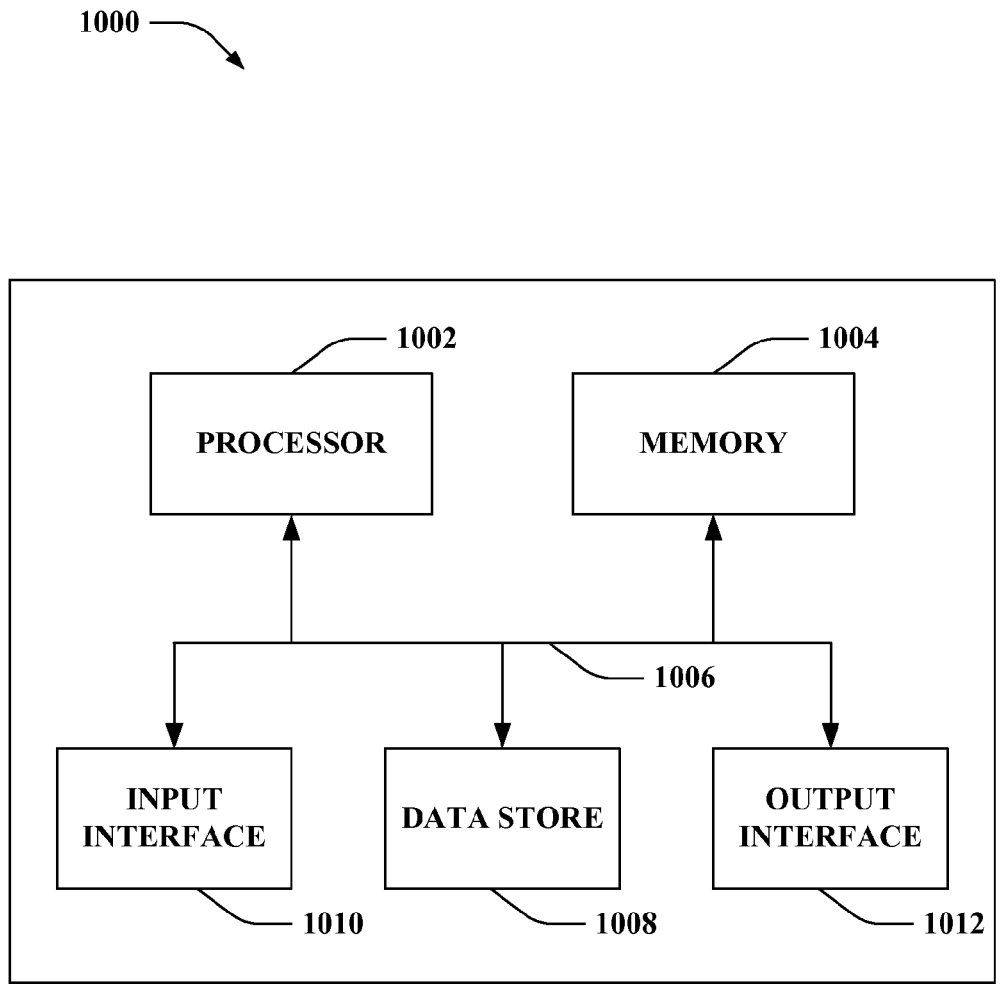
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be used in a system utilizes social activity data to personalize ranking of results returned by a computing operation. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store social activity data, behavior data, aggregated social activity data (e.g., social activity data aggregation models), results, ranked results, and so forth.

The computing device 1000 additionally includes a data store 1008 that is accessible by the processor 1002 by way of the system bus 1006. The data store 1008 may include executable instructions, social activity data, behavior data, aggregated social activity data (e.g., social activity data aggregation models), results, ranked results, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of utilizing social activity data to personalize ranking of results returned by a computing operation, comprising:
   performing the computing operation that returns the results for a user, wherein the computing operation is executed by a processor;
   for each of the results returned by the computing operation:
      forming a first group of historical users that clicked a corresponding result and a second group of the historical users that skipped the corresponding result based on behavior data of the historical users, wherein the behavior data of the historical users comprises respective logs of results that art clicked and results that are skipped by the historical users;
      calculating a respective first affinity of the user to the corresponding result based on correlations between social activity data of the user and social activity data of the first group of historical users that clicked the corresponding result; and
      calculating a respective second affinity of the user to the corresponding result based on correlations between the social activity data of the user and social activity data of the second group of the historical users that skipped the corresponding result; and
   ranking the results returned by the computing operation based at least in part on the respective first affinity and the respective second affinity of the corresponding result for each of the results.

2. The method of claim 1, wherein the computing operation that returns the results for the user is a search operation that returns search results responsive to a search query for the user.

3. The method of claim 1, wherein the computing operation that returns the results for the user is an autocomplete operation that returns suggested search queries for the user.

4. The method of claim 1, wherein the computing operation that returns the results for the user is an advertisement selection operation that returns advertisements for the user, the method further comprises:
   selecting one or more of the advertisements as ranked; and
   rendering, on a display, the one or more of the advertisements as selected.

5. The method of claim 1, wherein the social activity data of the user, the social activity data of the first group of the historical users that clicked the corresponding result, and the social activity data of the second group of the historical users that skipped the corresponding result comprise feedback pertaining to social network content respectively expressed by the user, the historical users in the first group, and the historical users in the second group.

6. The method of claim 1, wherein the social activity data of the user, the social activity data of the first group of the historical users that clicked the corresponding result, and the social activity data of the second group of the historical users that skipped the corresponding result comprise at least one of respective profile data, respective shared social network content, respective lists of installed applications, or respective lists of actively used applications for the user, the historical users in the first group, and the historical users in the second group.

7. The method of claim 1, further comprising combining the respective first affinity and the respective second affinity of the corresponding result to generate a respective combined affinity score of the corresponding result used for the ranking.

8. The method of claim 1, further comprising:
   calculating the respective first affinity of the user to the corresponding result as a sum over past impressions of a dot product between the social activity data of the user and the social activity data of the historical users in the first group that clicked the corresponding result; and
   calculating the respective second affinity of the user to the corresponding result as a sum over the past impressions of a dot product between the social activity data of the user and the social activity data of the historical users in the second group that skipped the corresponding result.

9. The method of claim 1, further comprising:
   calculating the respective first affinity of the user to the corresponding result as a dot product between the social activity data of the user and aggregated social activity data of the historical users in the first group that clicked the corresponding result; and calculating the respective second affinity of the user to the corresponding result as a dot product between the social activity data of the user and aggregated social activity data of the historical users in the second group that skipped the corresponding results.

10. The method of claim 1, wherein the social activity data of the first group of the historical users that clicked the corresponding result and the social activity data of the second group of the historical users that skipped the corresponding result are aggregated based on the behavior data of the historical users at one of a query-result level, a result level, a query-domain level, or a domain level.

11. The method of claim 1, calculating a respective combined affinity of the user to the corresponding result directly as a difference between the respective positive affinity and the respective negative affinity.

12. The method of claim 1, further comprising selecting a subset of attributes of the social activity data of the user, the social activity data of the first group of the historical users, and the social activity data of the second group of the historical users, wherein the respective first affinity and the respective second affinity are calculated based on the subset of the attributes as selected.

13. The method of claim 12, further comprising selecting the subset of the attributes as a function of a query, wherein the computing operation returns the results for the user responsive to the query.

14. A system that utilizes social activity data to personalize ranking of search results returned by a search operation for a user responsive to a search query, comprising:
 a data repository that comprises social activity data of a user and social activity data of historical users;
 a processor; and
 a memory that comprises components that are executable by the processor, the components comprising:
  a behavior group component that, for each of the search results returned by the search operation, forms a first group of the historical users that clicked a corresponding search result and a second group of the historical users that skipped the corresponding search result according to behavior data of the historical users retained in the data repository, wherein the behavior data of the historical users comprises respective logs of search results that are clicked and search results that are skipped by the historical users for a set of search queries,
  a correlation component that, for each of the search results returned by the search operation, calculates a respective positive affinity of the user to the corresponding search result and a respective negative affinity of the user to the corresponding search result, wherein the positive affinity is calculated based on correlations between the social activity data of the user and social activity data of the first group of the historical users that clicked the corresponding search result, and wherein the negative affinity is calculated based on correlations between the social activity data of the user and social activity data of the second group of the historical users that skipped the corresponding search result; and
  a rank component that ranks the search results returned by the search operation based at least in part on the respective positive affinity and the respective negative affinity of the corresponding search result for each of the search results.

15. The system of claim 14, wherein the social activity data of the user and the social activity data of the historical users comprise feedback pertaining to social network content respectively expressed by the user and the historical users.

16. The system of claim 14, wherein the social activity data of the user and the social activity data of the historical users comprise at least one of respective profile data, respective shared social network content, respective lists of installed applications for the historical users, or respective lists of actively used applications for the user and the historical users.

17. The system of claim 14, wherein the social activity data of the first group of the historical users that clicked the corresponding search result and the social activity data of the second group of the historical users that skipped the corresponding search result are aggregated based on the behavior data of the historical users at one of a query-result level, a result level, a query-domain level, or a domain level.

18. The system of claim 14, the correlation component further selects a subset of attributes of the social activity data of the user and the historical users as a function of the search query, wherein the correlation component calculates the positive affinity of the user to the corresponding search result and the negative affinity of the user to the corresponding search result based on the subset of the attributes.

19. A computer-readable storage medium including computer-executable instructions that, when executed by a processor, cause the processor to perform acts including:
 performing a search operation that returns search results for a user responsive to a search query, wherein the search operation is executed by a processor;
 for each of the search results returned by the search operation;
  forming a first group of historical users that clicked a corresponding search result and a second group of the historical users that skipped the corresponding search result based on behavior data of the historical users, wherein the behavior data of the historical users comprises respective logs of search results that are clicked and search results that are skipped by the historical users; and
  calculating a respective combined affinity of the user to the corresponding search result directly as a difference between a respective positive affinity and a respective negative affinity, wherein:
   the respective positive affinity is a dot product between social activity data of the user and aggregated social activity data of the first group of historical users that clicked the corresponding search result; and
   the respective negative affinity is a dot product between the social activity data of the user and aggregated social activity data of the second group of the historical users that skipped the corresponding search result; and
 ranking the search results returned by the search operation based at least in part on the respective combined affinity of the corresponding search result for each of the search results.

20. The computer-readable storage medium of claim 19, wherein the social activity data of the user and the aggregated social activity data of the historical users comprise feedback pertaining to social network content respectively expressed by the user and the historical users.

* * * * *